Figure 1:
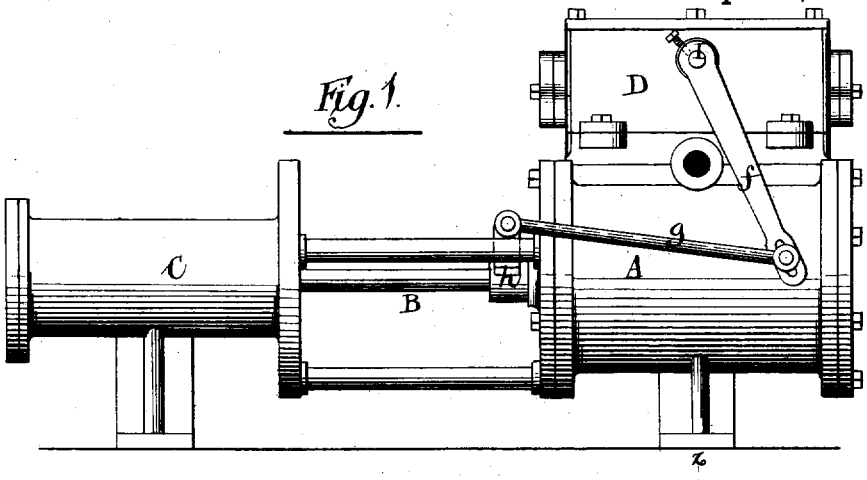

2 Sheets—Sheet 1.

W. H. GUILD, Jr.,

Assignor to GUILD & GARRISON.

VALVE ACTION OF DUPLEX ENGINES AND PUMPS.

No. 9,857. Reissued Sept. 6, 1881.

Witnesses:-

Fred Haynes

Ed Glatzmayer

Inventor:-

Wm H. Guild Jr by his Attorney

Robert Brown

N. PETERS, Photo-Lithographer, Washington, D. C.

2 Sheets—Sheet 2.

W. H. GUILD, Jr.,

Assignor to GUILD & GARRISON.

VALVE ACTION OF DUPLEX ENGINES AND PUMPS.

No. 9,857. Reissued Sept. 6, 1881.

Witnesses:-

Geo. E. Haynes

Ed. Platzmayer

Inventor.

Wm. H. Guild Jr.

by his Attorneys

Brown & Brown

N. PETERS, Photo-Lithographer, Washington, D. C.

UNITED STATES PATENT OFFICE.

WILLIAM H. GUILD, JR., OF BROOKLYN, NEW YORK, ASSIGNOR TO GUILD & GARRISON, OF SAME PLACE.

VALVE-ACTION OF DUPLEX ENGINES AND PUMPS.

SPECIFICATION forming part of Reissued Letters Patent No. 9,857, dated September 6, 1881.

Original No. 206,558, dated July 30, 1878. Application for reissue filed May 14, 1881.

*To all whom it may concern:*

Be it known that I, WILLIAM H. GUILD, Jr., of the city of Brooklyn, in the county of Kings and State of New York, have invented certain new and useful Improvements in Valve-Actions of Direct-Acting Engines and Pumps, of which the following is a description, reference being had to the accompanying drawings, forming part of this specification.

A part of this invention relates generally to the valves of direct-acting engines for pumping and other purposes in which the main valve is operated by an auxiliary piston, and an auxiliary valve is employed to admit steam to the auxiliary cylinder to act on the auxiliary piston; and this part of the invention consists in the combination, in a direct-acting engine, with a main slide-valve, an auxiliary piston and cylinder, and an auxiliary slide-valve, of a single rock-shaft operated by the engine-piston and provided with two toes, one of which engages with the auxiliary valve and the other of which engages with and operates the main valve and attached auxiliary piston during a part of each stroke of the engine, whereby the main valve, instead of having imparted to it a sudden movement from wide open in one direction to wide open in the other direction, as in most direct-acting engines, has imparted to it an easy motion, whereby steam may be shut off gradually from each end of the engine before being admitted to the other end.

The invention also relates particularly to duplex direct-acting engines for pumping and other purposes, in which the pistons of said engines operate to keep up a continuous action, and are set to move in relation with each other so that when one of said pistons is at half-stroke or thereabout the other of said pistons has completed its stroke.

The object of the invention applied to such engines is to provide for the automatic action of the valves which control said engines in a simpler or more perfect manner than has been done by causing each engine to actuate the inlet and outlet valves which govern the motive power of the other engine, as in previous arrangements or combinations; and the invention, in its application to such engines, consists in the combination therewith of valves organized so that one of said engines actuates the inlet and outlet valves which govern the motive power of both engines, and insures a full or active operation of either engine while the other one is changing its motion.

Although steam will hereinafter be referred to as the motive power employed to drive the engines, any other suitable propelling gas or fluid may be used.

Figure 2:
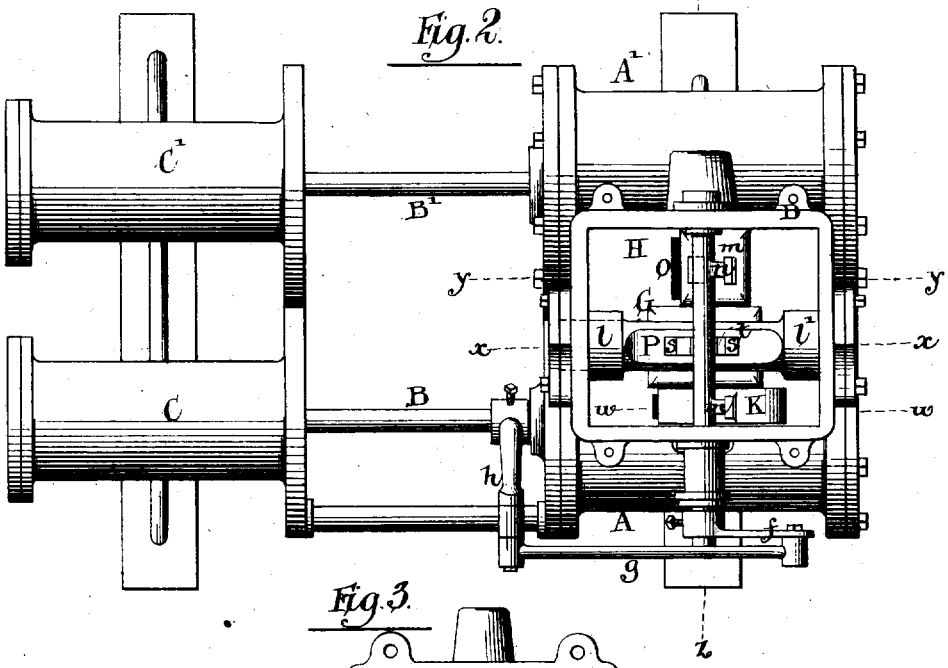
Figure 3:
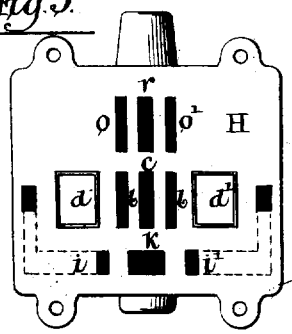
Figure 4:
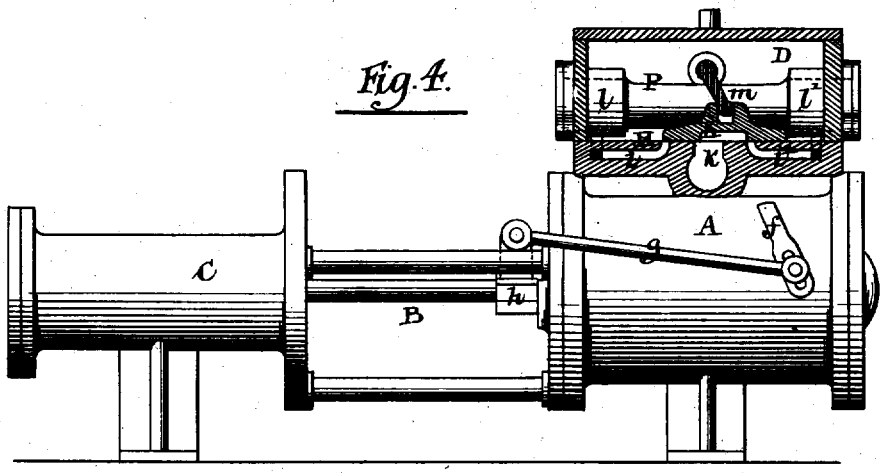
Figure 6:
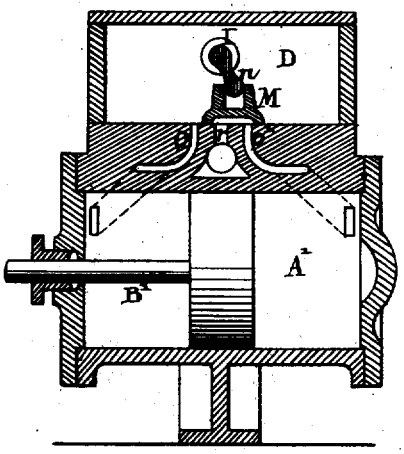
Figure 7:
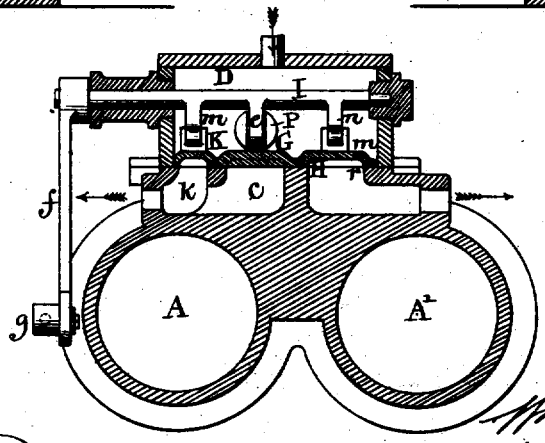

In the accompanying drawings, Figure 1 represents a side elevation of a horizontal duplex direct-acting pumping-engine or steam-pump having my invention applied. Fig. 2 is a plan of the same, with the valve-chest cover removed; and Fig. 3, a top view of the valve-seat within the chest, showing the several ports or passages which the valves of the two engines serve to control. Fig. 4 is a vertical longitudinal section mainly on the line *w w;* Fig. 5, a similar section, in part, mainly on the line *x x;* Fig. 6, a further similar section, in part, mainly on the line *y y;* and Fig. 7, a transverse vertical section on the line *z z.*

A A′ represent the two steam-cylinders, arranged to occupy a horizontal position; B B′, the piston-rods of said two cylinders.

D is a steam or valve chest common to both engines, and C C′ the pumping-cylinders.

The pistons of either engine—that is, of the cylinder A and its pumping-cylinder C, or of the cylinder A′ and its pumping-cylinder C′—are set and operated in relation with each other so that when the pistons of one of said engines are at half-stroke the pistons of the other of said engines are at the end of their stroke, as in other duplex direct-acting pumping-engines, and for the same purpose—viz., of keeping up a continuous action and avoiding concussion or shock.

The engine of which A is the working-cylinder (and which will here, for the convenience of description, be designated as the engine A, while the engine of which A′ is the working-cylinder will be designated as the engine A′) has the motion of its piston controlled by a main valve, G, which may be of a B construction, and serves to control the terminal passages *b b* and an intermediate exhaust-passage, *c*, to conduct the steam alternately to and to pass it off alternately from opposite ends of the engine-cylinder, according to the direction in which said valve is moved and the cavities in it are brought in covered or uncovered relation with receiving and discharging recesses *d d'* in the valve-seat H. This valve G is represented as operated in part directly by the engine A, which it controls, and in part by the auxiliary piston P, working in the auxiliary cylinder *l l'* at the ends of the steam-chest D. The first part of this operation, by which the steam is shut off or nearly shut off from the engine gradually, is produced by the toe *e* on the rock-shaft I, which passes transversely through the steam-chest, and which is worked by a lever, *f*, fast on one end of it and connected by a rod, *g*, with a cross head or arm, *h*, secured on the piston-rod B of the said engine A. The second part of the said operation, which is produced by the auxiliary piston P, and by which steam is admitted to the engine for the return-stroke, is controlled by the auxiliary valve K, which is operated by the toe *m* on the rock-shaft I, the said valve working over ports *i i'*, leading between the steam-chest and the auxiliary cylinder *l l'* and an exhaust-port, *k*.

Figure 5:
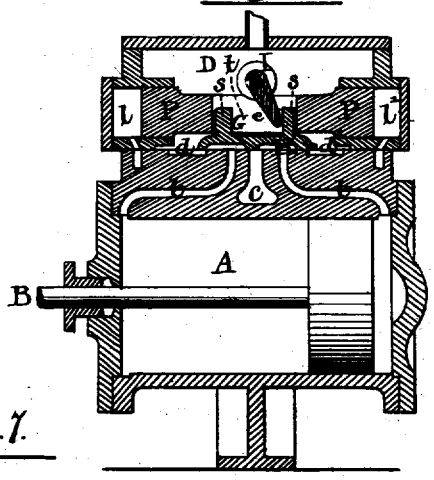

The connection of the tappet *m* with the auxiliary valve K is made, as shown in Fig. 4; without lost motion; but there is so much lost motion between the tappet *e* and the lugs *s s* on the back of the main valve G, on which the said tappet operates, as will be seen in Fig. 5, that the rock-shaft I may make a great part of its movement produced by its connection with the engine-piston without acting upon the said valve. The lugs *s s* on the said valve G so fit a slot, *t*, in the auxiliary piston that the said valve must move without any lost motion with the said piston, which is thus engaged with the toe *e* and operated thereby during a part of each stroke of the engine.

The valves G and K operate, in relation with each other and with the piston of the engine A, which they control, as follows: When the main valve G, as actuated by the piston-rod B, rock-shaft I, and toe *e*, nearly reaches its central position in one direction, as shown in Fig. 5, and is nearly closed, the auxiliary valve K is opened by the tappet *m* and lets on steam to that one of the cylinders *l* or *l'* which will be the working one, to act on one end of the piston P and complete the throw of the valve G, and so produce the completion of the movement of the engine-piston in the direction in which it was traveling, the opposite end of the piston P being simultaneously exposed to the exhaust. This action of the valves G and K takes place alternately in reverse directions during the travel of the engine-piston in opposite courses, or accordingly as it is required to admit steam to and exhaust steam from opposite ends alternately of the cylinder of the engine, the main valve G being almost entirely closed before the letting in of steam to the auxiliary cylinders by the auxiliary valve, and the main valve moving to shut off steam at about half the stroke of the engine-piston in either direction, thereby working the steam expansively for the balance of the stroke, as in other combined auxiliary and main valves for direct acting engines.

In some cases the main valve G need not be operated in part by the piston-rod B of the engine, but may depend for its entire throw upon the auxiliary valve K; but it is preferred to limit the action of the latter to completing the throw of the main valve, and to construct the auxiliary valve with lap on its exhaust and lead on its steam side. The same piston-rod B that thus operates the auxiliary valve K, and in part also the main valve G, controls likewise the main valve M of the cylinder or engine A'—as, for instance, through the rock-shaft I and a tappet or toe, *n*—said valve, which may be an ordinary D one, controlling terminal passages *o o'* and an intermediate exhaust-passage, *r*, the terminal passages connecting respectively with opposite ends of the cylinder of said engine. Thus the one engine actuates the valves which control the motion of both engines, the pistons of which are simultaneously at different positions in their respective strokes.

The mere arrangement or construction of the valve-gear and valves here shown is not, so far as it applies to duplex engines, absolutely essential, and may be variously changed, and the valves may be worked from a rock-shaft on the outside of a valve-chest, instead from the inside thereof.

What I claim as my invention, and desire to secure by Letters Patent, is—

1. In a direct-acting engine, the combination, with a main valve, an auxiliary piston and cylinder, and an auxiliary slide-valve, of a single rock-shaft operated by the engine and provided with two toes, one of which engages with and operates said auxiliary slide-valve, and the other of which engages with and operates said main valve and auxiliary piston during a part of the stroke of the engine, whereby motion is imparted directly from a single rock-shaft to both the auxiliary slide-valve and the main valve and auxiliary piston, substantially as specified.

2. The combination, with two direct-acting engines, the pistons of which are simultaneously at different positions in their respective strokes, of induction and eduction valves, the movements of all of which are produced or controlled by the reciprocating motion of the piston of one of said engines, and which are organized to control the motion of the pistons of both engines, substantially as specified.

3. The combination, with the two direct-acting engines, of a main valve for controlling the motion of one of said engines, an auxiliary valve for completing the throw of said main valve, and a main valve for the other of said engines, deriving its motion from the engine which is controlled by the auxiliary valve, essentially as described.

4. The combination, with one and the same driving rock-shaft, of the auxiliary valve which controls the motion of one engine and the main valve which controls the motion of the other engine, substantially as specified.

W. H. GUILD, JR.

Witnesses:

HENRY T. BROWN,

FREDK. HAYNES.